J. A. ROSS.
SHEEP HOOK.
APPLICATION FILED NOV. 19, 1909. RENEWED DEC. 19, 1910.
992,906.
Patented May 23, 1911.
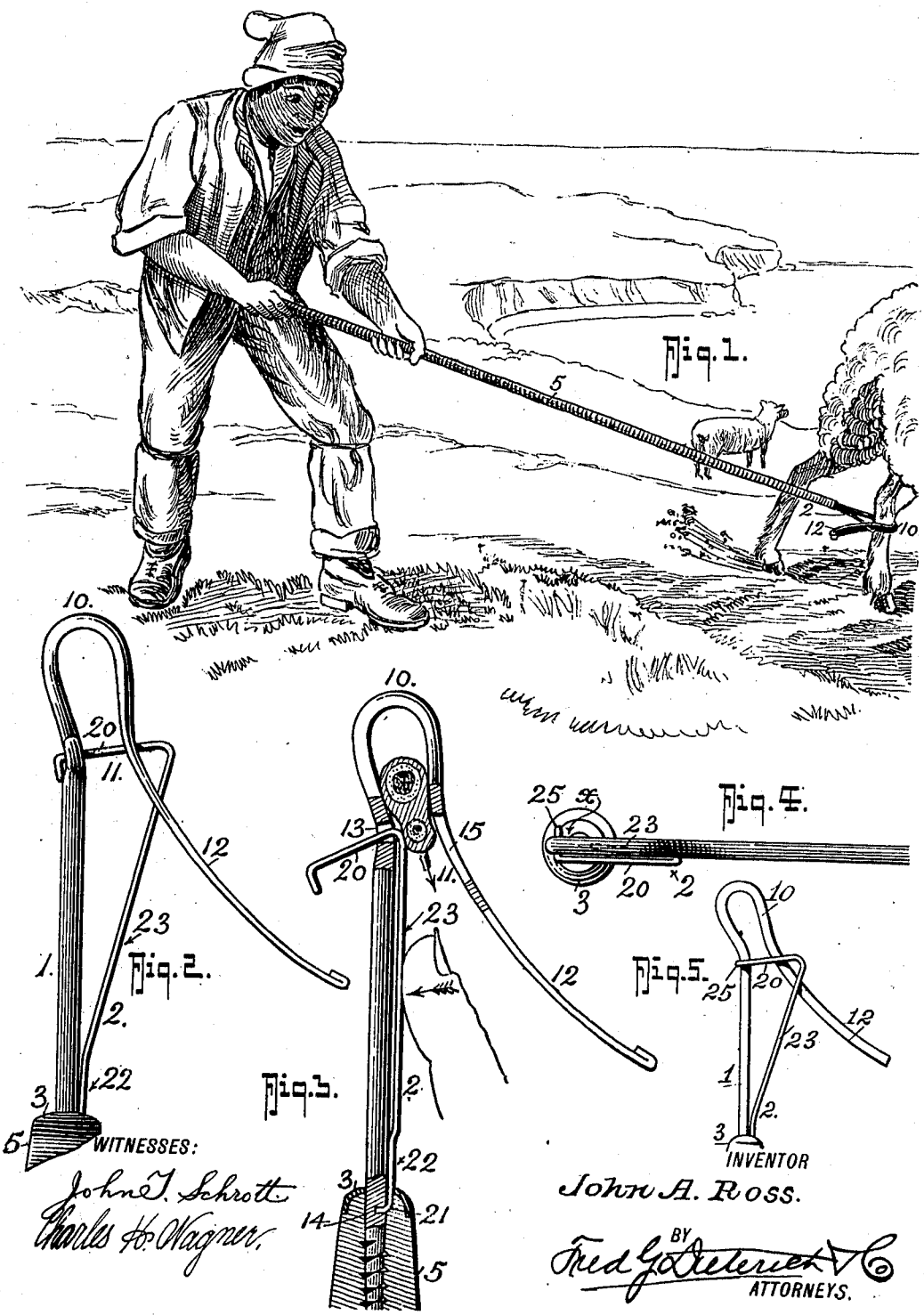

UNITED STATES PATENT OFFICE.

JOHN A. ROSS, OF WEISER, IDAHO, ASSIGNOR OF ONE-THIRD TO BUTTERFIELD LIVE STOCK COMPANY, LTD., AND ONE-THIRD TO WILLIAM N. McCONNEL, OF WEISER, IDAHO.

SHEEP-HOOK.

992,906.   Specification of Letters Patent.   Patented May 23, 1911.

Application filed November 19, 1909, Serial No. 528,992.   Renewed December 19, 1910.   Serial No. 598,164.

*To all whom it may concern:*

Be it known that I, JOHN A. ROSS, residing at Weiser, in the county of Washington and State of Idaho, have invented a new and Improved Sheep-Hook, of which the following is a specification.

This invention relates to that type of sheep hook known as a shepherd's crook, and more particularly has for its object to provide an implement of the character stated, of a simple and economical construction, capable of being readily manipulated for easily grasping the leg of the sheep and holding the sheep from kicking, and with sufficient freedom of the legs that the sheep will not be hurt or injured when caught.

With the above objects in view, this invention comprehends generally, a crook formed of a rod, having one end shaped to provide a loop and tapering entrance thereto, the other end terminating in a screw tang to receive the handle portions of the opposite sides of the entrance to the loop being flattened and formed with openings, and a latch device formed of spring wire secured at one end to the threaded end of the rod and having its other end bent and held to automatically close the entrance to the loop and having portions movable and guided in the openings in opposite rod portions.

In its more specific nature, my invention consists in the detailed arrangement of the parts, hereinafter fully described, specifically pointed out in the appended claims and illustrated in the accompanying drawing, in which:

Figure 1, is a perspective view that shows the manner in which this invention catches on the sheep's leg. Fig. 2, is a side elevation thereof, the hook device being at the normal position. Fig. 3, is a similar view, parts being in section and the latch member being shown as moved back to free the hook from the sheep's leg. Fig. 4, is a top plan view of a hook, showing a modification of snap spring. Fig. 5, is a side elevation on a smaller scale of the form shown in Fig. 4.

In the practical application of my present invention I take a stout wire rod 1 and flatten one end thereof and bend the said flattened portion upon itself to form a loop or crook portion 10 of such diameter that it will freely engage around the leg of the animal, the throat or entrance 11 to the said loop being slightly restricted, and the outer portion of the bent over end extended and curved gradually outwardly from the throat 11 to form a guide 12 for making it convenient and easy to slip the crook over the sheep's leg in a manner that is clearly understood from Fig. 1 of the drawing, and to avoid injury to the sheep's leg when slipping the crook thereon, the extreme outer end of guide 12 is curved or rounded as shown.

At the throat 11 the opposite portions of the bent rod 1 are formed with openings, the opening 13 in the shank end being only sufficient to allow for a free slide movement of the cross member 20 of the spring rod 2 of which the latch device is formed, the said device consisting of the rod, one end of which has a short hook 21 adapted for filling in socket 14 formed in the tang end of the rod 1, a short straight portion 22 adapted for lying flatwise against the rod 1 and which passes through a cup-shaped ferrule 3 that is slipped and wedged onto the rod 1.

From the portion 22 the spring wire rod extends diagonally as at 23 across the entrance to the crook or loop portion and through the elongated slot or opening 15 in the guide member 12, the said rod portion 23 merging with the cross member 20.

In Fig. 4, is shown a somewhat modified form of my invention, in which the rod 1 is not flattened at the crook or bent end and is not formed with the openings 13 and 15 before referred to. In this form the spring rod member 2 is secured to the handle or shank end of the rod so its angle or latch end lies flatwise against the opposite or throat portions of the rod, and in this form of my invention the outer end of the angle member 20 of spring wire 2 is bent laterally to form a stop 25 that extends and engages the part *x* of the rod 1 and serves to hold the latch member from springing back too far.

5 designates the long handle or staff, into one end of which is screwed the threaded end of the rod 1 which, when applied to the handle 5, is screwed home tight enough to bring the cup-shaped ferrule 3 tightly over the end of the staff whereby to curve said end down over the upper or hooked end of the rod 2 and thereby provide additional means for securely holding the spring 2 securely on the rod, 1.

From the foregoing, taken in connection with the drawing, the manner of its use and the advantages of my invention will be readily apparent.

Having thus described my invention, what I claim is:

1. As a new article, an implement of the character described, comprising a crook formed of rod metal and including a loop portion, one end of which terminates in a screw threaded tang, the other end of which from the loop portion extends outwardly to form a guide, the opposing portions of the rod at the entrance to the loop being flattened, and each formed with an opening, a cup-shaped ferrule on the threaded end of the rod, a spring wire latch, one end of which is bent to form a cross head, the angled portion being movable through the opening in the guide portion of the rod, the free end of the cross head being movable through the opening in the opposite portion of the rod, the other end of the wire having a portion for interlocking with the threaded shank and to be flatwise thereon, said end being projected through the cup-shaped ferrule, the cross end of the wire being bent to form a stop hook and a handle mounted on the threaded shank with its end seated in the cup shaped ferrule.

2. An implement of the character described, that comprises a crook member formed of a stout rod and having a leg loop, one end of which terminates in a screw shank for receiving a handle thereon, the other end of which is curved outwardly to form a guide to the entrance to the loop, a latch consisting of a wire that has one end shaped to interlock with the threaded shank, and adapted to be clenched on the shank by the handle when forced home on the threaded shank.

3. A sheep's hook that consists of a crook formed of a stout wire rod having a leg loop, a shank for engaging a handle and a curved arm that forms a guide to the loop, the portions of the rod at opposite sides of the entrance to the loop being flattened and each having an opening, and a latch formed of spring wire, one end of which is secured flatwise to the handle or shank end of the rod, its other end being bent to form a cross head, the angle end of said head being movably held in the opening in the guide arm, and the free end of said head being movable in the opening in the shank part of the loop, said end being bent to form a stop to limit the out-thrust of the latch.

JOHN A. ROSS.

Witnesses:
J. B. O. Tool,
A. F. Smith.

---

Copies of this patent may be obtained for five cents each, by addressing the "Commissioner of Patents, Washington, D. C."